US009806891B2

(12) United States Patent
Schmirler et al.

(10) Patent No.: US 9,806,891 B2
(45) Date of Patent: Oct. 31, 2017

(54) SYSTEM AND METHOD FOR AN EXTENDED WEB OF TRUST

(71) Applicant: Rockwell Automation Technologies, Inc., Mayfield Heights, OH (US)

(72) Inventors: Paul D. Schmirler, Glendale, WI (US); Timothy S. Biernat, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 26 days.

(21) Appl. No.: 14/744,933

(22) Filed: Jun. 19, 2015

(65) Prior Publication Data
US 2015/0372823 A1    Dec. 24, 2015

Related U.S. Application Data

(60) Provisional application No. 62/016,005, filed on Jun. 23, 2014.

(51) Int. Cl.
*H04L 29/00* (2006.01)
*H04L 9/32* (2006.01)
*G06Q 10/06* (2012.01)
*H04L 12/24* (2006.01)
*H04L 29/08* (2006.01)

(52) U.S. Cl.
CPC ............ *H04L 9/3265* (2013.01); *G06Q 10/06* (2013.01); *H04L 9/3263* (2013.01); *H04L 41/0813* (2013.01); *H04L 67/10* (2013.01); *H04L 67/125* (2013.01)

(58) Field of Classification Search
CPC .......................... H04L 9/3265; H04L 9/3263
See application file for complete search history.

(56) References Cited

U.S. PATENT DOCUMENTS

| 2005/0149922 A1 | 7/2005 | Vincent |
| 2007/0005736 A1 | 1/2007 | Hansen et al. |
| 2010/0083356 A1 | 4/2010 | Steckley et al. |
| 2011/0072421 A1 | 3/2011 | Parry et al. |

(Continued)

FOREIGN PATENT DOCUMENTS

EP        2660667 A2 * 11/2013 ........... G05B 19/042

*Primary Examiner* — Brandon Hoffman
*Assistant Examiner* — Helai Salehi

(57) ABSTRACT

An industrial automation gateway providing an extended web of trust is provided. The industrial automation gateway includes a cloud communication interface coupled with a cloud automation facility, a hardware memory, and a processor coupled with the cloud communication interface and the hardware memory. The cloud automation facility includes a cloud hardware memory storing a cloud root certificate from a first root certificate authority and a subordinate certificate. The hardware memory stores a gateway root certificate from a second root certificate authority and the subordinate certificate. The processor is configured to determine if the subordinate certificate has been certified by the first root certificate authority and the second root certificate authority. The processor is also configured to transfer automation data to the cloud automation facility using the subordinate certificate only if the subordinate certificate has been certified by the first root certificate authority and the second root certificate authority.

18 Claims, 6 Drawing Sheets

(56) References Cited

U.S. PATENT DOCUMENTS

| | | |
|---|---|---|
| 2012/0226737 A1 | 9/2012 | Rajaraman et al. |
| 2013/0212214 A1 | 8/2013 | Lawson et al. |
| 2014/0033191 A1 | 1/2014 | Ward |
| 2014/0181506 A1* | 6/2014 | Resch ................. H04L 63/0823 713/156 |
| 2014/0337234 A1* | 11/2014 | Tang ..................... H04L 9/3265 705/71 |
| 2014/0354405 A1* | 12/2014 | Kocher .................. G06F 21/32 340/5.82 |
| 2015/0149781 A1* | 5/2015 | Logue ............... H04W 52/0212 713/171 |
| 2016/0277261 A9 | 9/2016 | Ansari et al. |

* cited by examiner

SYSTEM AND METHOD FOR AN EXTENDED WEB OF TRUST

RELATED APPLICATIONS

This application hereby claims the benefit of and priority to U.S. Provisional Patent Application No. 62/016,005, titled "INDUSTRIAL AUTOMATION NODE AND METHOD", filed on Jun. 23, 2014 and which is hereby incorporated by reference in its entirety.

TECHNICAL BACKGROUND

Industrial automation is used to control machines and processes in manufacturing. Automated machines commonly control the handling of components, sub-components, and raw materials, perform fabrication processes, testing, product handling, packaging, and shipping. Industrial automation enables precise control of industrial processes, achievement of smaller tolerances and better quality products, higher production outputs, and increased worker safety and productivity.

Industrial automation installations comprise multiple computerized devices that control industrial machines and industrial processes. The components of an industrial automation installation must work together in a coordinated fashion, performing operations such as exchanging data, controlling the timing and scheduling of processes, providing information to operators or technicians, and receiving operator inputs.

Because of the large number of system variables that must be monitored and controlled, industrial automation systems often generate vast amounts of data. In addition to production statistics, data relating to machine health, alarm status, operator feedback, electrical or mechanical load, and the like are often monitored. The data is generated by the many industrial devices that can make up a given automation system, including industrial controllers and associated I/O, telemetry devices, motion control devices, valves, conveyors, raw material handling systems, product handling systems, visualization applications, traceability systems, and the like. Moreover, such industrial facilities can operate on a twenty-four hour basis, wherein automation systems can generate a vast amount of data.

In addition, industrial automation monitoring has evolved from monitoring devices in an industrial plant to include monitoring devices at remote sites, such as mobile or temporary facilities. Industrial automation monitoring can be used for drilling, mining, and other resource extraction operations. Industrial automation monitoring can be used in monitoring water treatment facilities or in monitoring of environmental conditions. Industrial automation monitoring can be used to monitor the health and operation of industrial automation devices including field equipment.

Industrial automation devices can generate industrial automation data at multiple, geographically disparate locations. The industrial automation data can be collected via the cloud, wherein industrial automation data can be accumulated and made available to a user or users via the cloud. Where the industrial automation devices are distributed geographically, the cloud advantageously provides a facility for accessing data from multiple, distributed industrial automation devices.

While good solutions exist today for securing communications across industrial automation devices across a factory floor, it is critical that secure, private, trusted communications are maintained from these on-premises industrial automation devices up to these cloud-hosted services.

OVERVIEW

In an embodiment, an industrial automation gateway providing an extended web of trust is provided. The industrial automation gateway includes a cloud communication interface coupled with, and configured for communication with, a cloud automation facility, a hardware memory, and a processor coupled with the cloud communication interface and the hardware memory. The cloud automation facility includes a cloud hardware memory storing a cloud root certificate from a first root certificate authority and a subordinate certificate. The hardware memory stores a gateway root certificate from a second root certificate authority and the subordinate certificate. The processor is configured to determine if the subordinate certificate has been certified by the first root certificate authority and the second root certificate authority. The processor is also configured to transfer automation data to the cloud automation facility using the subordinate certificate only if the subordinate certificate has been certified by the first root certificate authority and the second root certificate authority.

In another embodiment, a method for providing an extended web of trust within an industrial automation gateway is provided. The method includes receiving a gateway root certificate from a first root certificate authority, and storing the gateway root certificate in a gateway hardware memory along with a subordinate certificate. The method also includes receiving a command from a cloud automation facility, the cloud automation facility comprising a cloud hardware memory storing a cloud root certificate from a second root certificate authority and the subordinate certificate.

The method further includes determining if the subordinate certificate has been certified by the first root certificate authority and the second root certificate authority, and executing the command from the cloud automation facility only if the subordinate certificate has been certified by both the first root certificate authority and the second root certificate authority.

In a further embodiment, one or more non-transitory computer-readable media having stored thereon program instructions to facilitate an extended web of trust within an industrial automation gateway is provided. The program instructions, when executed by a computing system, direct the computing system to at least receive a gateway root certificate from a first root certificate authority, and store the gateway root certificate in a gateway hardware memory along with a subordinate certificate. The instructions also direct the computing system to receive a command from a cloud automation facility, the cloud automation facility comprising a cloud hardware memory storing a cloud root certificate from a second root certificate authority and the subordinate certificate.

The instructions further direct the computing system to determine if the subordinate certificate has been certified by the first root certificate authority and the second root certificate authority, and execute the command from the cloud automation facility only if the subordinate certificate has been certified by both the first root certificate authority and the second root certificate authority.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
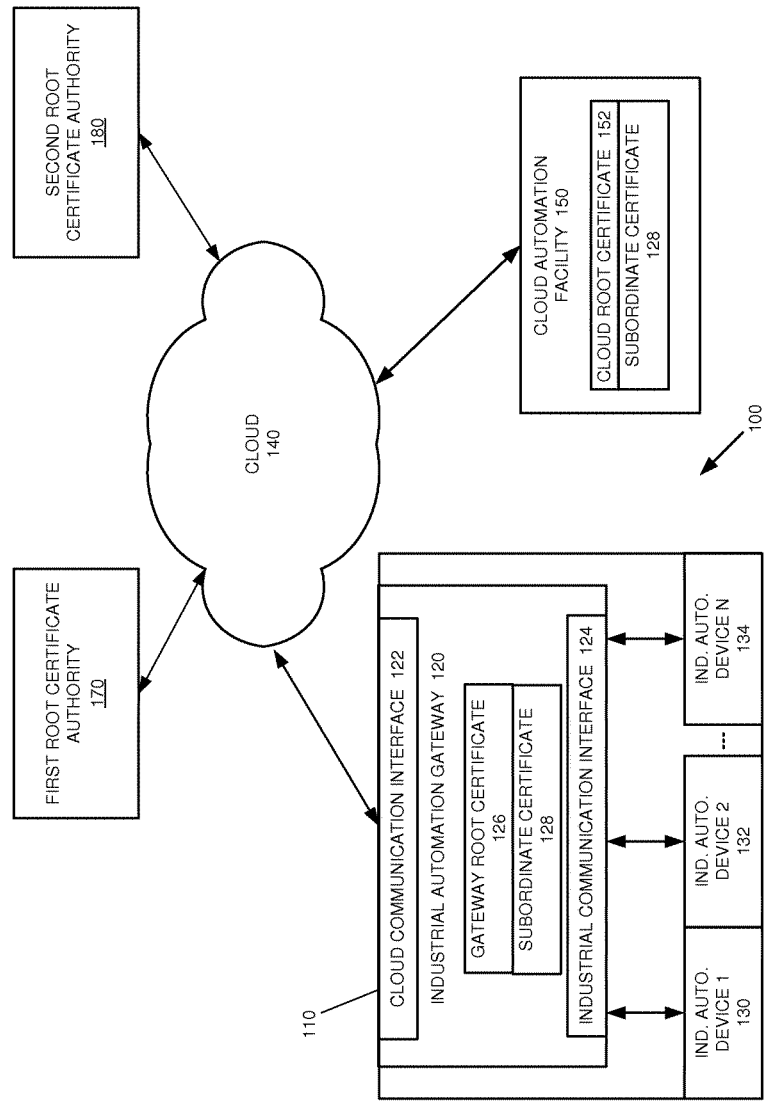
FIG. 1 illustrates an exemplary industrial automation system.

FIG. 1 shows an exemplary industrial automation node 110. Industrial automation node 110 is part of an industrial automation system 100, with the industrial automation system 100 further including cloud 140 and cloud automation facility 150. Industrial automation node 110 is in communication with cloud 140. Industrial automation node 110 communicates continuously, periodically, or intermittently with cloud 140. Industrial automation node 110 communicates with cloud 140 via a wired or wireless communication channel. Industrial automation node 110 in some examples communicates with cloud 140 via a cellular communication link and exchanges communications with cloud 140 via a cellular telephone communication protocol. In such an example, industrial automation node 110 has an account with a cellular provider.

Industrial automation node 110 in some examples is located in a manufacturing plant or other industrial facility. Alternatively, in other examples industrial automation node 110 is remotely located and comprises a small facility, a temporary facility, a mobile facility, or other self-contained facility. In other examples, industrial automation node 110 is substantially stationary or is fixed in location.

Industrial automation node 110 performs some manner of industrial automation operation or operations. Industrial automation node 110 generates and/or gathers industrial automation data. Industrial automation data can include timestamps that indicate when data portions were generated or collected. Industrial automation node 110 transfers the industrial automation data to cloud 140 for storage, analysis, and other uses. Industrial automation node 110 further transfers operational information to cloud 140 in some examples, including operational status and operational characteristic. Industrial automation node 110 in some examples receives information from cloud 140, including programming, measurement values or other information needed for operation of industrial automation node 110, requests for operational status and operational characteristics from industrial automation node 110, and other information.

Industrial automation node 110 relays industrial automation data to cloud automation facility 150. Industrial automation node 110 may also accumulate, process, filter, compress, or otherwise modify the industrial automation data before relaying it to cloud automation facility 150. In addition, industrial automation node 110 may periodically transfer a heartbeat message to cloud automation facility 150.

Cloud 140 comprises a network or association of connected computer devices and digital electronic resources that can be used to perform processing and to relay communications. The term "cloud" is a shorthand reference to cloud computing infrastructure. The cloud includes one or more communication networks, such as the Internet, for example, and can further include portions of an industrial communications network, such as a local area network (LAN) or a wide area network (WAN). In cloud computing, a computing process may run on one or many connected cloud computers at the same time. In cloud computing, the cloud can host and run an application anywhere in the world. Further, cloud 140 enables access to the application from anywhere.

Cloud 140 includes one or more data storage facilities for storing received industrial automation data in some examples. Cloud 140 receives industrial automation data from industrial automation node 110 and accumulates and stores the industrial automation data. Cloud 140 in some examples processes and/or analyzes the industrial automation data.

Cloud automation facility 150 is configured to communicate with industrial automation node 110 via cloud 140 and provide cloud services to industrial automation node 110. Cloud services can include, but are not limited to, data storage, data analysis, control applications, visualization applications such as cloud-based Human-Machine Interfaces (HMIs), reporting applications, Enterprise Resource Planning (ERP) applications, notification services, or other such applications.

Cloud automation facility 150 is configured to obtain industrial automation data of industrial automation node 110 via cloud 140. In addition, cloud automation facility 150 stores and provides configuration information to industrial automation node 110. Cloud automation facility 150 includes (in a hardware memory) a copy of cloud root certificate 152 which it has obtained from first root certificate authority 170, and a copy of subordinate certificate 128. Cloud root certificate 152 is a part of a public key infrastructure scheme. Digital certificates are verified using a chain of trust. The trust anchor for the digital certificate is the root certificate authority.

Cloud root certificate 152 and subordinate certificate 128 are unsigned or self-signed public key certificates that identify the root certificate authority and certifies the ownership of the public key by the named subject of the certificate.

Industrial automation node 110 in the example shown includes one or more industrial automation devices 130-134 and industrial automation gateway 120 coupled to the one or more industrial automation devices 130-134. The one or more industrial automation devices 130-134 perform industrial automation operations. The one or more industrial automation devices 130-134 can be selected and included in industrial automation node 110 to perform specific automation tasks.

Industrial automation node 110 interacts with cloud-based computing services that are hosted by cloud 140. The cloud platform comprises infrastructure that allows shared computing services to be accessed and utilized by cloud-capable devices. The cloud platform can be a public cloud that is accessible via the Internet by devices having Internet connectivity and appropriate authorizations to utilize commercially-available communication services. In some examples, access to the cloud platform and associated services can be provided to customers as subscription services.

Providing the one or more industrial automation devices 130-134 with cloud capability can offer a number of advantages. Cloud-based storage can be easily scaled to accommodate the large quantities of data that can be generated daily by an industrial automation enterprise. Moreover, multiple industrial automation facilities at different geographical locations can migrate their respective automation data to the cloud 140 for aggregation, collation, collective analysis, and enterprise-level reporting without the need to establish a private network between the facilities.

Cloud-based diagnostic applications can monitor the health of respective automation systems or their associated industrial devices across an entire plant, or across multiple industrial automation facilities. Cloud-based control applications can be used to track a unit of product (or a unit or units of raw materials) through stages of production, collecting data for each unit at each stage.

Industrial automation node 110 can accept a number of and variety of industrial automation devices 130-134. The one or more industrial automation devices 130-134 can be installed to and removed from industrial automation node 110 in some examples. The one or more industrial automation devices 130-134 in some examples comprise batch control systems, continuous control systems, or discrete control systems. The one or more industrial automation devices 130-134 can include devices such as industrial controllers (e.g., programmable logic controllers or other types of programmable automation controllers), field devices such as sensors, meters, valves, motor drives, actuators, HMIs, industrial robots, barcode markers and readers, vision system devices, welders, or other such industrial devices.

Industrial automation gateway 120 includes cloud communication interface 122 and industrial communication interface 124. Cloud communication interface 122 is configured to communicate with cloud 140. Industrial communication interface 124 is configured to communicate with the one or more industrial automation devices 130-134.

Industrial communication interface 124 facilitates monitoring and control of a process or processes. Industrial communication interface 124 exchanges data with the one or more industrial automation devices 130-134 using a communication system such as native hardwired I/O or via a plant network such as Ethernet/IP, Data Highway Plus, ControlNet, Devicenet, or the like. Industrial communication interface 124 typically receives any combination of digital or analog signals from the one or more industrial automation devices 130-134 indicating a current state of the one or more industrial automation devices 130-134 and associated processes.

Cloud communication interface 122 comprises a communication interface that exchanges communications with cloud 140. Cloud communication interface 122 uses any suitable communication protocol. Cloud communication interface 122 performs wired and/or wireless communications with cloud 140, as needed. Cloud communication interface 122 can employ one or more different types of communications modules to connect with mobile-phone carriers, Wi-Fi providers, and other communications-services providers from locations in which wireless service can be obtained. Cloud communication interface 122 in some examples performs wireless communications with cloud 140 using a cellular communications protocol, including cellular communications protocols such as 2G (second generation)/CDMA, 3G/LTE, 4G, 5G, or any other suitable cellular telephone communication protocol. Alternatively, cloud communication interface 122 uses other suitable wireless communication protocols. By employing cloud communication interface 122, cloud-computing services can be extended into many different, geographically dispersed areas and to a variety of technologies and uses for which traditional wireless-service subscriptions would not be economically feasible.

Industrial automation gateway 120 can transfer substantially real-time industrial automation data to cloud 140. However, if industrial automation gateway 120 determines that communications are not possible, or if industrial automation gateway 120 determines that it is not time for an industrial automation data upload, industrial automation gateway 120 can transfer bulk industrial automation data to cloud 140. In such a situation, industrial automation gateway 120 enters a store-and-forward mode, wherein industrial automation node 110 accumulates industrial automation data and transfers the accumulated industrial automation data to cloud 140 at predetermined time periods.

Industrial automation gateway 120 in some examples includes multiple communication ports. Industrial automation gateway 120 in some examples includes wired and wireless communication ports. Consequently, industrial automation gateway 120 may be able to communicate with cloud 140 in various ways and using more than one communication protocol or scheme.

In some examples, industrial automation gateway 120 provides security. Industrial automation gateway 120 can provide access control, screening or limiting communications. Industrial automation gateway 120 can encrypt the industrial automation data being transferred to cloud 140.

Industrial automation gateway 120 in some examples is a small footprint device, such as the netbiter™ remote communication gateway, available from HMS Industrial Networks. The netbiter™ remote communication gateway includes GSM/GPRS cellular communication capability and includes Ethernet wired communication capability. Industrial automation gateway 120 in some examples has a small physical size, uses a low amount of electrical energy, performs as little processing or communicating as needed, adds minimal latency to data transfers or operations in industrial automation node 110, or a combination of these factors, for example.

Industrial automation gateway 120 comprises a fixed hardware and software in some examples. Alternatively, industrial automation gateway 120 comprises a communication card or other communication device that can be installed into and removed from industrial automation node 110. Corresponding gateway software can be obtained by industrial automation node 110 for a current gateway device or for a current gateway device format/protocol.

In some examples, the software for industrial automation gateway 120 is configurable, such as by cloud 140 or by cloud automation facility 150. Further, the gateway software can be dynamically updated or modified.

Industrial automation gateway 120 also includes (in a hardware memory) a copy of gateway root certificate 126 which it has obtained from second root certificate authority 180 along with a copy of subordinate certificate 128. Gateway root certificate 126 and subordinate certificate 128 are part of a public key infrastructure scheme. Digital certificates are verified using a chain of trust. The trust anchor for the digital certificate is the root certificate authority.

Gateway root certificate 126 and subordinate certificate 128 are unsigned or self-signed public key certificates that identify the root certificate authority and certifies the ownership of the public key by the named subject of the certificate. When industrial automation gateway 120, cloud automation facility 150, or an external device wish to verify communications with industrial automation gateway 120 and cloud automation facility, they may use subordinate certificate 128 to communicate between them. In order to verify that both cloud automation facility 150 and industrial automation gateway are what they appear to be, and that communication between them will be secure, subordinate certificate 128 must be certified by both first root certificate authority 170 and second root certificate authority 180.

In some examples, industrial automation gateway 120 is configured to request a configuration update from cloud 140 or cloud automation facility 150, with the request including information including a current configuration 126 (and can include other information such as information about the one or more installed industrial automation devices 130-134), receive a configuration update 128 in response, if a configuration update 128 is needed or warranted, and implement the received configuration update 128. In such a case, industrial automation gateway 120 first determines that subordinate certificate 128 has been certified by both first root certificate authority 170 and second root certificate authority 180 to guarantee that both devices are what they appear to be and that communications between the devices will be secure using the public key contained within subordinate certificate 128.

In some examples, industrial automation node 110 comprises one or more industrial automation devices 130-134 configured to generate industrial automation and an industrial automation gateway 120 in communication with the one or more industrial automation devices 130-134 and in communication with a cloud automation facility 150, with industrial automation gateway 120 configured to determine a current configuration 126 of the gateway 120, transfer the current configuration 126 to cloud automation facility 150, and receive and implement a configuration update 128 from cloud automation facility 150. In such a case, industrial automation gateway 120 first determines that subordinate certificate 128 has been certified by both first root certificate authority 170 and second root certificate authority 180 to guarantee that both devices are what they appear to be and that communications between the devices will be secure using the public key contained within subordinate certificate 128. In some examples, industrial automation node 110 performs a configuration update without any operator inputs.

In some examples, the configuration information comprises communication parameters, data collection parameters, and data conditioning parameters. The communication parameters define communications characteristics for industrial automation node 110, such as communication times/intervals, communication types/protocols, a number of stored messages per upload package, a maximum upload frequency and/or bandwidth limits, and a size or time limit for storing industrial automation data in a disconnected state, for example. The data collection parameters define data collection parameters for the one or more industrial automation devices 130-134 of industrial automation node 110, such as data to be collected and tags or alarms to be collected from specific industrial automation devices 130-134, and how often data is to be collected, for example. The data conditioning parameters define data conditioning operations to be performed, such as filtering, compression, transformation, etc. It should be understood that additional communication parameters, data collection parameters, and data conditioning parameters are contemplated and are within the scope of the description and claims.

Figure 2:
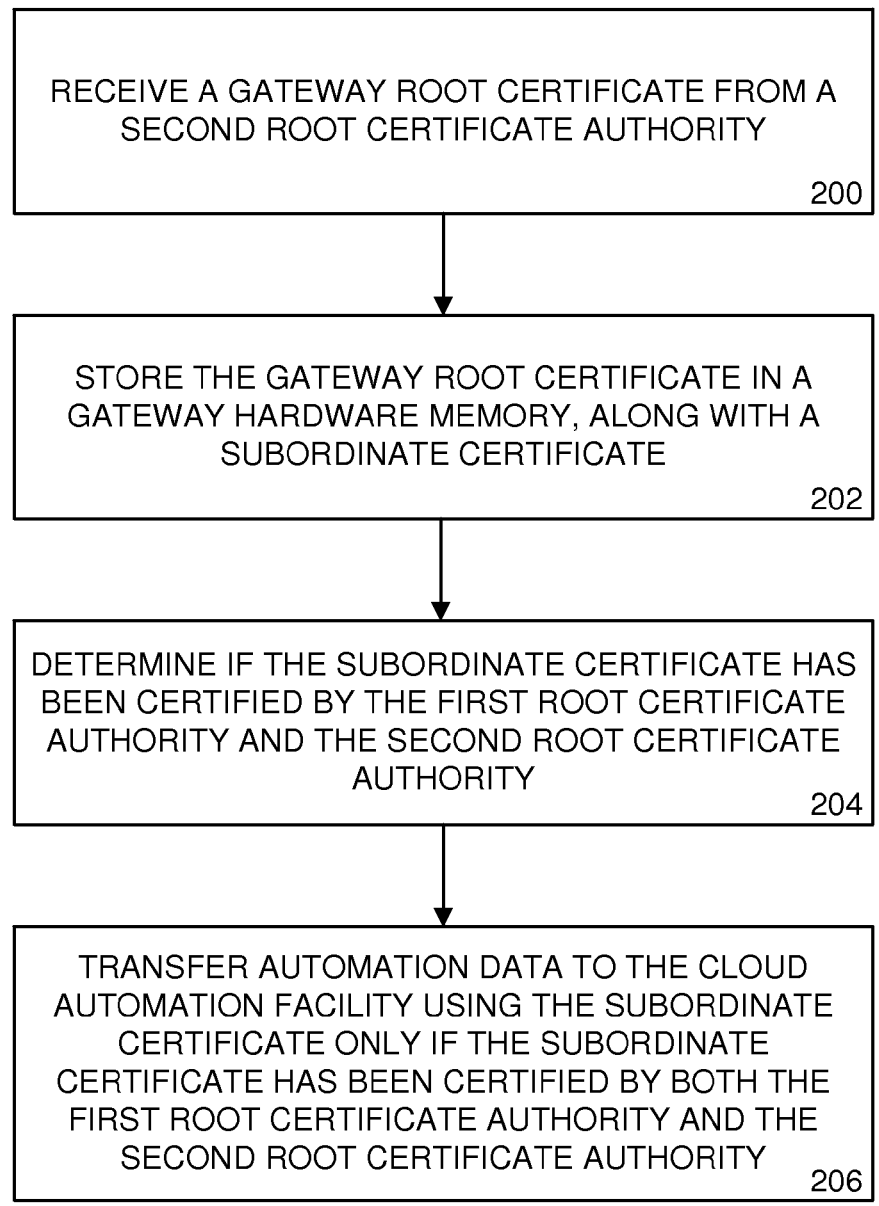
FIG. 2 illustrates an exemplary flowchart for the operation of an industrial automation gateway.

FIG. 2 illustrates an exemplary flowchart for the operation of industrial automation gateway 120. In this example, industrial automation gateway 120 will be in communication with cloud automation facility 150. Cloud automation facility 150 includes a hardware memory storing cloud root certificate 152 obtained from first root certificate authority 170, along with a copy of subordinate certificate 128. In order to secure communication between industrial automation gateway 120 and cloud automation facility 150, subordinate certificate 128 is used.

In this example, industrial automation gateway 120 receives a gateway root certificate 126 from second root certificate authority 180, (operation 200). Industrial automation gateway 120 then stores gateway root certificate 126 in a gateway hardware memory along with subordinate certificate 128, (operation 202).

Industrial automation gateway 120 determines if subordinate certificate 128 has been certified by first root certificate authority 170 and second root certificate authority 180, (operation 204). Industrial automation gateway 120 transfers automation data to cloud automation facility 150 using subordinate certificate 128 only if subordinate certificate 128 has been certified by both first root certificate authority 170 and second root certificate authority 180, (operation 206).

Figure 3:
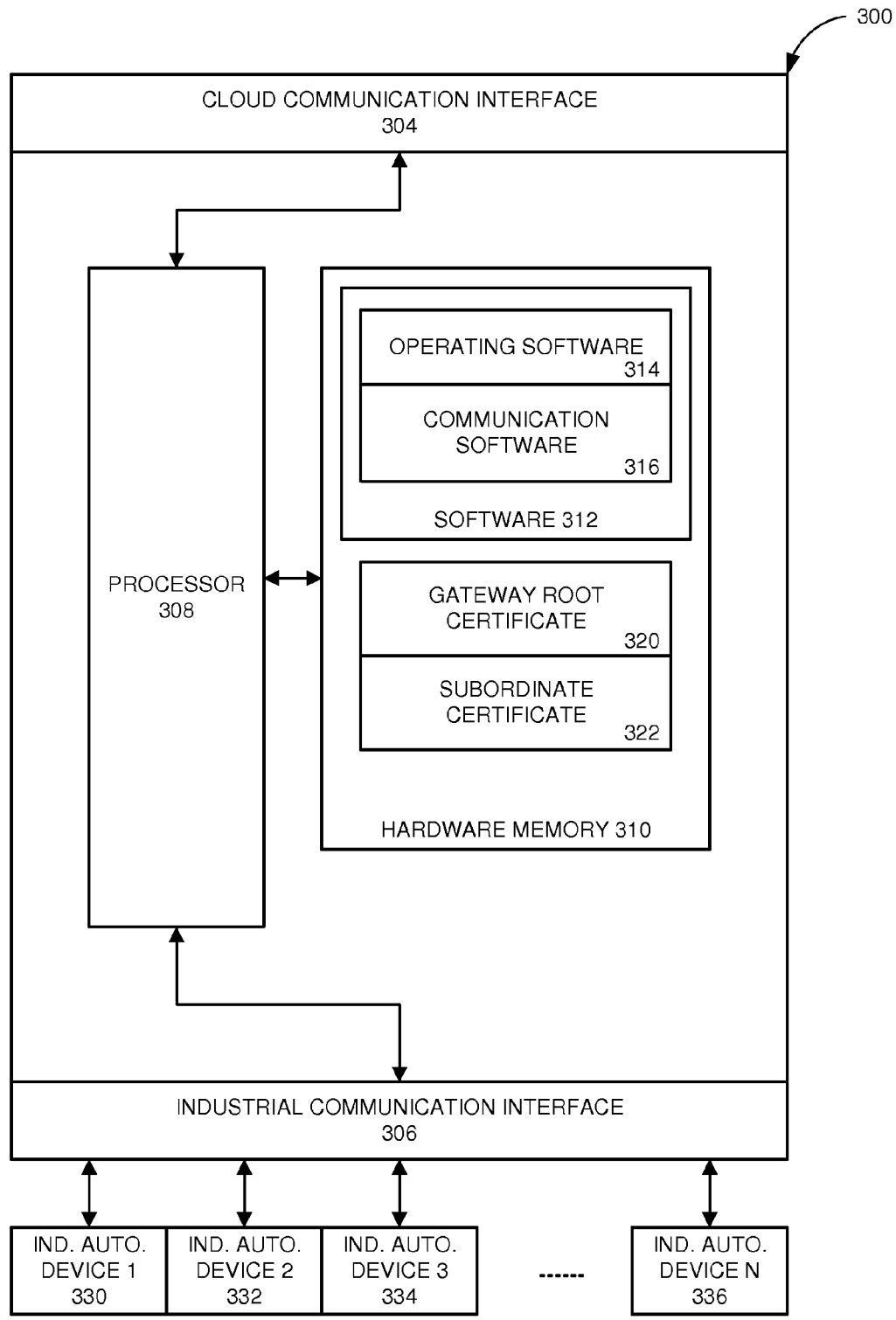
FIG. 3 illustrates a block diagram of a computer system configured to operate as an industrial automation gateway.

FIG. 3 illustrates a block diagram of a computer system configured to operate as an industrial automation gateway 300, such as industrial automation gateway 120 from FIG. 1.

Industrial automation node 300 includes cloud communication interface 304, industrial communication interface 306, processor 308 coupled to cloud communication interface 304 and to industrial communication interface 306, and hardware memory 310 coupled to processor 308. Hardware memory 310 can be separate from or included in processor 308.

The hardware memory 310 in the example shown includes software 312. In some examples, software 312 comprises operating software 314 that configure the industrial automation gateway 300, when executed by the industrial automation gateway 300 in general or processor 308 in particular, to direct industrial automation gateway 300 to perform industrial automation node operations. Software 312 may also comprise communication software 316 used to instruct processor 308 on interacting with cloud communication interface 304 and industrial communication interface 306. Other data, such as gateway root certificate 320 and subordinate certificate 322, is also stored in hardware memory 310.

Processor 308 may comprise a microprocessor and other circuitry that retrieves and executes software 312 from hardware memory 310. Processor 308 may be implemented within a single processing device, but may also be distributed across multiple processing devices or sub-systems that cooperate in executing program instructions. Examples of processor 308 include general purpose central processing units, application specific processors, and logic devices, as well as any other type of processing device, combinations, or variations.

Hardware memory 310 may comprise any computer readable storage media readable by processor 308 and capable of storing software 312. Hardware memory 310 may include volatile and nonvolatile, removable and non-removable media implemented in any method or technology for storage of information, such as computer readable instructions, data structures, program modules, or other data. Hardware memory 310 may be independent from or integrated into processor 308. Hardware memory 310 can comprise additional elements, such as a memory controller, capable of communicating with processor 308. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations hardware memory 310 may also include communication media over which software 312 may be communicated internally or externally. Hardware memory 310 may be implemented as a single storage device but may also be implemented across multiple storage devices or sub-systems co-located or distributed relative to each other. Hardware memory 310 may comprise additional elements capable of communicating with processor 308 or possibly other systems.

Software 312 may be implemented in program instructions and among other functions and may, when executed by processor 308, direct processor 308 to operate as described herein. In particular, the program instructions may include various components or modules that cooperate or otherwise interact to implement at least a portion of industrial automation gateway 300. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 312 in the examples comprises computer programs, firmware, or some other form of machine-readable processing instructions. Software 312 may include an operating system, utilities, drivers, network interfaces, applications, virtual machines, or some other type of software. Software 312 may include additional processes, programs, or components, such as operating system software or other application software. Software 312 may also comprise firmware or some other form of machine-readable processing instructions executable by processor 308.

In general, software 312, when loaded into processor 308 and executed, may transform a suitable apparatus, system, or device from a general-purpose computing system into a special-purpose computing system customized to provide an extended web of trust, among other operations. Indeed, encoding software 312 on the memory 310 may transform the physical structure of the memory 310. The specific transformation of the physical structure may depend on various factors in different implementations of this description. Examples of such factors may include, but are not limited to the technology used to implement the storage media of the memory 310 and whether the computer-storage media are characterized as primary or secondary storage, as well as other factors.

Cloud communication interface 304 may include communication connections and devices that allow for communication with other computing systems over a communication network or collection of networks. Cloud communication interface 304 may include user input and output devices for being controlled by a user.

Cloud communication interface 304 comprises a network card, network interface, port, or interface circuitry that allows industrial automation gateway 300 to communicate over a network or networks. Cloud communication interface 304 may also include a memory device, software, processing circuitry, or some other device. Cloud communication interface 304 can use any suitable communication protocol to exchange communications.

Cloud communication interface 304 may include components that communicate over communication links, such as network cards, ports, RF transceivers, processing circuitry and software, or other communication components. Cloud communication interface 304 may be configured to communicate over electrically conductive, wireless, optical, or other links Cloud communication interface 304 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Industrial communication interface 306 may include communication connections and devices that allow for communication with other computing systems over a communication network or collection of networks. Industrial communication interface 306 may include user input and output devices for being controlled by a user.

Industrial communication interface 306 comprises a network card, network interface, port, or interface circuitry that allows industrial automation gateway 300 to communicate over a network or networks. Industrial communication interface 306 may also include a memory device, software, processing circuitry, or some other device. Industrial communication interface 306 can use any suitable communication protocol to exchange communications.

Industrial communication interface 306 may include components that communicate over communication links, such as network cards, ports, RF transceivers, processing circuitry and software, or other communication components. Industrial communication interface 306 may be configured to communicate over electrically conductive, wireless, optical, or other links.

Industrial communication interface 306 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Figure 4:
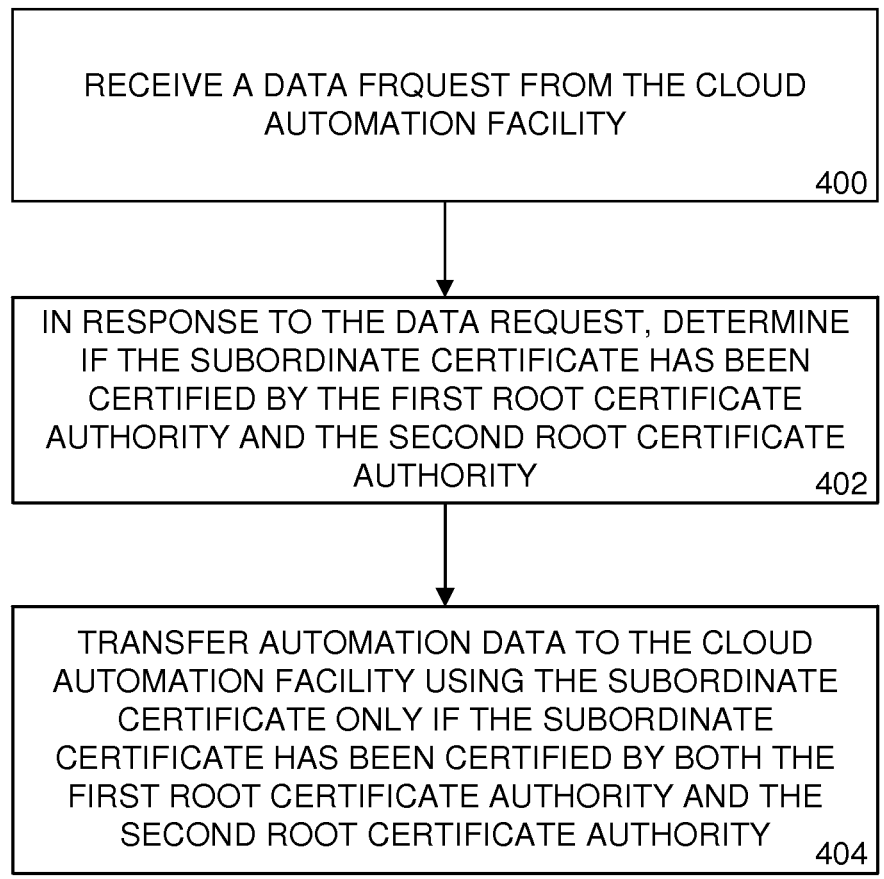
FIG. 4 illustrates an exemplary flowchart for the operation of an industrial automation gateway in another example.

FIG. 4 illustrates an exemplary flowchart for the operation of industrial automation gateway 300 in another example. In this example, industrial automation gateway 300 will be in communication with cloud automation facility 150. Cloud automation facility 150 includes a hardware memory storing cloud root certificate 152 obtained from first root certificate authority 170, along with a copy of subordinate certificate 128. In order to secure communication between industrial automation gateway 300 and cloud automation facility 150, subordinate certificate 128 is used.

In this example, industrial automation gateway 300 receives a data request from cloud automation facility 150, (operation 400). In response to the data request, industrial automation gateway 300 determines if subordinate certificate 128 has been certified by first root certificate authority 170 and second root certificate authority 180 (operation 402).

Industrial automation gateway 300 transfers automation data to cloud automation facility 150 using subordinate certificate 128 only if subordinate certificate 128 has been certified by both first root certificate authority 170 and second root certificate authority 180, (operation 404).

Figure 5:
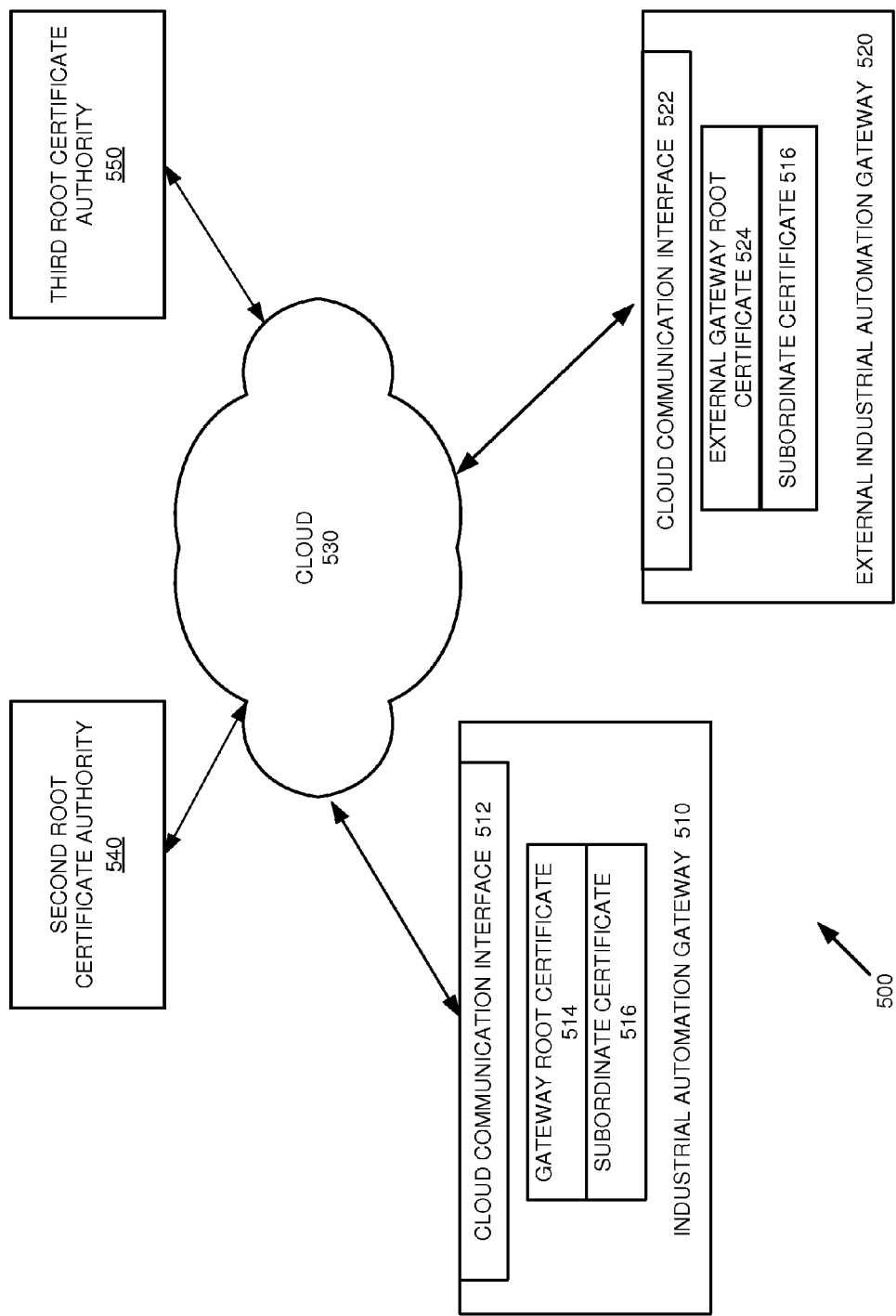
FIG. 5 illustrates another exemplary industrial automation system including two industrial automation gateways.

FIG. 5 illustrates another exemplary industrial automation system including two industrial automation gateways. In this example embodiment, industrial automation system 500 includes industrial automation gateway 510, external industrial automation gateway 520, the cloud 530, second root certificate authority 540, and third root certificate authority 550.

Industrial automation gateway 510 and external industrial automation gateway 520 are similar in structure and performance to industrial automation gateway 120 and 300 illustrated in FIGS. 1 and 3 respectively. In this example, industrial automation gateway 510 includes a hardware memory storing gateway root certificate 514 received from second root certificate authority 540 along with subordinate certificate 516. Industrial automation gateway 510 communicates with the cloud 530 through cloud communication interface 512.

External industrial automation gateway 520 includes a hardware memory storing external gateway root certificate received from third root certificate authority 550 along with subordinate certificate 516. External industrial automation gateway 520 communicates with the cloud 530 through cloud communication interface 522.

In this example, when industrial automation gateway 510 receives a data request from external industrial automation gateway 520, it must first guarantee that external industrial automation gateway 520 is the device it claims to be and verify its public key in order to provide secure communication between the two gateways.

Industrial automation gateway 520 uses subordinate certificate 516 to provide secure communication with external industrial automation gateway 520 by determining if subordinate certificate 516 has been certified by both second root certificate authority 540 and third root certificate authority 550 before transferring any data.

Figure 6:
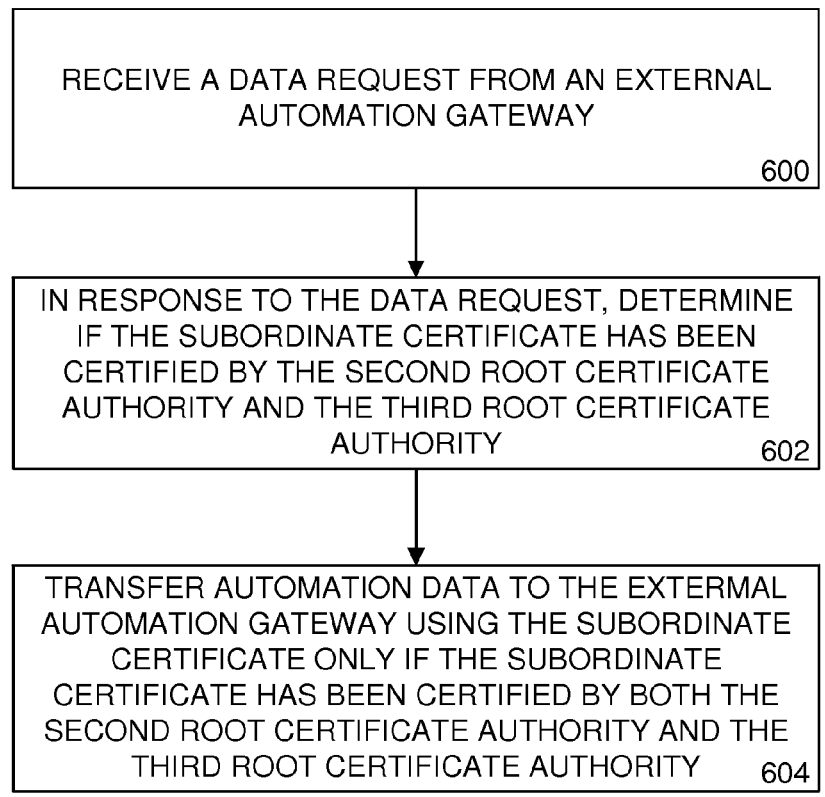
FIG. 6 illustrates an exemplary flowchart for the operation of an industrial automation gateway in further example.

FIG. 6 illustrates an exemplary flowchart for the operation of industrial automation gateway 300 in further example. In this example, industrial automation gateway 510 will be in communication with external industrial automation gateway 520. Industrial automation gateway 510 includes a hardware memory storing gateway root certificate 514 obtained from second root certificate authority 540, along with a copy of subordinate certificate 516. External industrial automation gateway 520 includes a hardware memory storing external gateway root certificate 524 obtained from third root certificate authority 550, along with a copy of subordinate certificate 516. In order to secure communication between industrial automation gateway 510 and external industrial automation gateway 520, subordinate certificate 516 is used.

In this example, industrial automation gateway 510 receives a data request from external automation gateway 520, (operation 600). In response to the data request, industrial automation gateway 510 determines if subordinate certificate 516 has been certified by second root certificate authority 540 and third root certificate authority 550, (operation 602).

Industrial automation gateway 510 transfers automation data to external automation gateway 520 using subordinate certificate 516 only if subordinate certificate 516 has been certified by both second root certificate authority 540 and third root certificate authority 550, (operation 604).

Figure 7:
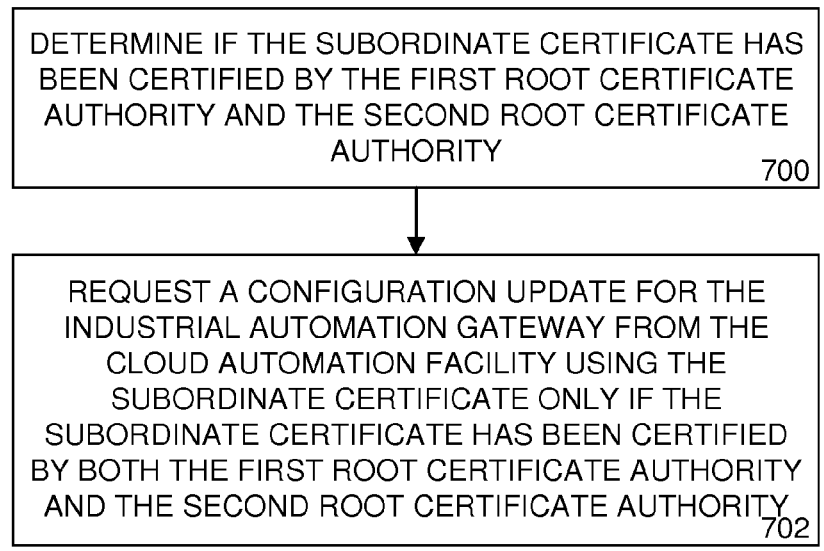
FIG. 7 illustrates an exemplary flowchart for the operation of an industrial automation gateway in still another example.

FIG. 7 illustrates an exemplary flowchart for the operation of industrial automation gateway 120 in still another example. In this example, industrial automation gateway 120 needs a configuration update from cloud automation facility 150. Industrial automation gateway 120 includes a hardware memory storing gateway root certificate 126 obtained from second root certificate authority 180, along with a copy of subordinate certificate 128. Cloud automation facility 150 includes a hardware memory storing cloud root certificate 152 obtained from first root certificate authority 170, along with a copy of subordinate certificate 128. In order to secure communication between industrial automation gateway 120 and cloud automation facility 150, subordinate certificate 128 is used.

In this example, industrial automation gateway 120 determines if subordinate certificate 128 has been certified by first root certificate authority 170 and second root certificate authority 180, (operation 700).

Industrial automation gateway 120 requests a configuration update for itself from cloud automation facility 150 using subordinate certificate 128 only if subordinate certificate 128 has been certified by both first root certificate authority 170 and second root certificate authority 180, (operation 704).

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An industrial automation gateway providing an extended web of trust comprising:
   a cloud communication interface coupled with, and configured for communication with, a cloud automation facility, the cloud automation facility comprising a cloud hardware memory storing a cloud root certificate from a first root certificate authority and a subordinate certificate;
   a hardware memory storing a gateway root certificate from a second root certificate authority and the subordinate certificate; and
   a processor coupled with the cloud communication interface and the hardware memory, configured to:
     determine if the subordinate certificate has been certified by the first root certificate authority and the second root certificate authority; and
     transfer automation data to the cloud automation facility using the subordinate certificate only if the subordinate certificate has been certified by both the first root certificate authority and the second root certificate authority.

2. The industrial automation gateway of claim 1, wherein the processor is further configured to:

receive a data request from the cloud automation facility;
in response to the data request, determine if the subordinate certificate has been certified by the first root certificate authority and the second root certificate authority; and
transfer automation data to the cloud automation facility using the subordinate certificate only if the subordinate certificate has been certified by both the first root certificate authority and the second root certificate authority.

3. The industrial automation gateway of claim 1, wherein the processor is further configured to:
receive a data request from an external industrial automation gateway through the cloud communication interface, the external automation gateway having an external gateway root certificate from a third root certificate authority and the subordinate certificate;
in response to the data request, determine if the subordinate certificate has been certified by the second root certificate authority and the third root certificate authority; and
transfer automation data to the external industrial automation gateway using the subordinate certificate only if the subordinate certificate has been certified by both the second root certificate authority and the third root certificate authority.

4. The industrial automation gateway of claim 1, wherein the processor is further configured to:
determine if the subordinate certificate has been certified by the first root certificate authority and the second root certificate authority; and
request configuration data for the industrial automation gateway from the cloud automation facility using the subordinate certificate only if the subordinate certificate has been certified by both the first root certificate authority and the second root certificate authority.

5. The industrial automation gateway of claim 2, wherein the processor is further configured to:
deny all data transfer requests to the cloud automation facility if the subordinate certificate has not been certified by both the first root certificate authority and the second root certificate authority.

6. The industrial automation gateway of claim 3, wherein the processor is further configured to:
deny all data transfer requests to the external industrial automation gateway if the subordinate certificate has not been certified by both the second root certificate authority and the third root certificate authority.

7. A method for providing an extended web of trust within an industrial automation gateway comprising:
receiving a gateway root certificate from a second root certificate authority;
storing the gateway root certificate in a gateway hardware memory along with a subordinate certificate;
receiving a command request from a cloud automation facility, the cloud automation facility comprising a cloud hardware memory storing a cloud root certificate from a first root certificate authority and the subordinate certificate;
determining if the subordinate certificate has been certified by the first root certificate authority and the second root certificate authority; and
receiving the command from the cloud automation facility using the subordinate certificate using the subordinate certificate only if the subordinate certificate has been certified by both the first root certificate authority and the second root certificate authority.

8. The method of claim 7, further comprising:
receiving a data request from the cloud automation facility;
in response to the data request, determining if the subordinate certificate has been certified by the first root certificate authority and the second root certificate authority; and
transferring automation data to the cloud automation facility using the subordinate certificate only if the subordinate certificate has been certified by both the first root certificate authority and the second root certificate authority.

9. The method of claim 7, further comprising:
receiving a data request from an external industrial automation gateway through the cloud communication interface, the external automation gateway having an external gateway root certificate from a third root certificate authority and the subordinate certificate;
in response to the data request, determining if the subordinate certificate has been certified by the second root certificate authority and the third root certificate authority; and
transferring automation data to the external industrial automation gateway using the subordinate certificate only if the subordinate certificate has been certified by both the second root certificate authority and the third root certificate authority.

10. The method of claim 7, further comprising:
determining if the subordinate certificate has been certified by the first root certificate authority and the second root certificate authority; and
requesting configuration data for the industrial automation gateway from the cloud automation facility using the subordinate certificate only if the subordinate certificate has been certified by both the first root certificate authority and the second root certificate authority.

11. The method of claim 8, further comprising:
denying all data transfer requests to the cloud automation facility if the subordinate certificate has not been certified by both the first root certificate authority and the second root certificate authority.

12. The method of claim 9, further comprising:
denying all data transfer requests to the external industrial automation gateway if the subordinate certificate has not been certified by both the second root certificate authority and the third root certificate authority.

13. One or more non-transitory computer-readable media having stored thereon program instructions to facilitate an extended web of trust within an industrial automation gateway, wherein the program instructions, when executed by a computing system, direct the computing system to at least:
receive a gateway root certificate from a second root certificate authority;
store the gateway root certificate in a gateway hardware memory along with a subordinate certificate;
receive a command request from a cloud automation facility, the cloud automation facility comprising a cloud hardware memory storing a cloud root certificate from a first root certificate authority and the subordinate certificate;
determine if the subordinate certificate has been certified by the first root certificate authority and the second root certificate authority; and
receive the command from the cloud automation facility using the subordinate certificate only if the subordinate certificate has been certified by both the first root certificate authority and the second root certificate authority.

14. The one or more non-transitory computer-readable media of claim 13, further comprising program instructions, which when executed by the computing system, direct the computing system to at least:
receive a data request from the cloud automation facility;
in response to the data request, determine if the subordinate certificate has been certified by the first root certificate authority and the second root certificate authority; and
transfer automation data to the cloud automation facility using the subordinate certificate only if the subordinate certificate has been certified by both the first root certificate authority and the second root certificate authority.

15. The one or more non-transitory computer-readable media of claim 13, further comprising program instructions, which when executed by the computing system, direct the computing system to at least:
receive a data request from an external industrial automation gateway through the cloud communication interface, the external automation gateway having an external gateway root certificate from a third root certificate authority and the subordinate certificate;
in response to the data request, determine if the subordinate certificate has been certified by the second root certificate authority and the third root certificate authority; and
transfer automation data to the external industrial automation gateway using the subordinate certificate only if the subordinate certificate has been certified by both the second root certificate authority and the third root certificate authority.

16. The one or more non-transitory computer-readable media of claim 13, further comprising program instructions, which when executed by the computing system, direct the computing system to at least:
determine if the subordinate certificate has been certified by the first root certificate authority and the second root certificate authority; and
request configuration data for the industrial automation gateway from the cloud automation facility using the subordinate certificate only if the subordinate certificate has been certified by both the first root certificate authority and the second root certificate authority.

17. The one or more non-transitory computer-readable media of claim 14, further comprising program instructions, which when executed by the computing system, direct the computing system to at least:
deny all data transfer requests to the cloud automation facility if the subordinate certificate has not been certified by both the first root certificate authority and the second root certificate authority.

18. The one or more non-transitory computer-readable media of claim 15, further comprising program instructions, which when executed by the computing system, direct the computing system to at least:
deny all data transfer requests to the external industrial automation gateway if the subordinate certificate has not been certified by both the second root certificate authority and the third root certificate authority.

* * * * *